(No Model.)

J. W. HARTMAN & H. P. CLAY
WAGON BRAKE

No. 400,675. Patented Apr. 2, 1889.

Witnesses.
A. Ruppert
W Burris

Inventor:
John W. Hartman
Henry P. Clay
Per
Thomas P. Simpson

UNITED STATES PATENT OFFICE.

JOHN W. HARTMAN, OF MAPLETON, AND HENRY P. CLAY, OF PRESCOTT, KANSAS.

WAGON-BRAKE.

SPECIFICATION forming part of Letters Patent No. 400,675, dated April 2, 1889.

Application filed January 14, 1889. Serial No. 296,305. (No model.)

*To all whom it may concern:*

Be it known that we, JOHN W. HARTMAN, of Mapleton, Bourbon county, Kansas, and HENRY P. CLAY, of Prescott, Linn county, Kansas, citizens of the United States, have invented certain new and useful Improvements in Wagon-Brakes; and we do declare the following to be a full, clear, and exact description of the invention, such as will enable others skilled in the art to which it appertains to make and use the same, reference being had to the accompanying drawings and to the letters and figures of reference marked thereon, which form a part of this specification.

The special object of our invention is to adjust the brake-bars of a wagon-brake so that the rubbers will not be clogged up with mud from the wheels in wet weather and will not be in danger of receiving injury from trees or other obstructions.

Figure 1:
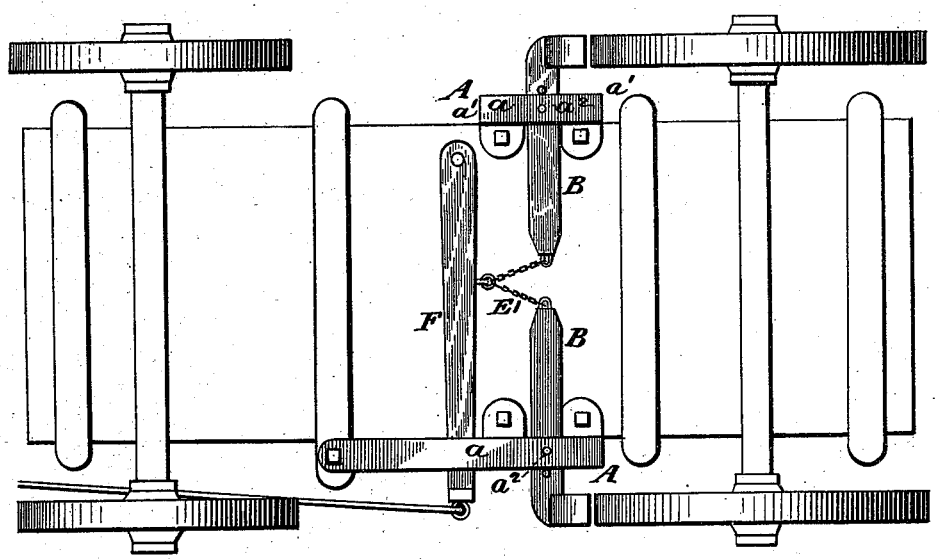
Figure 2:
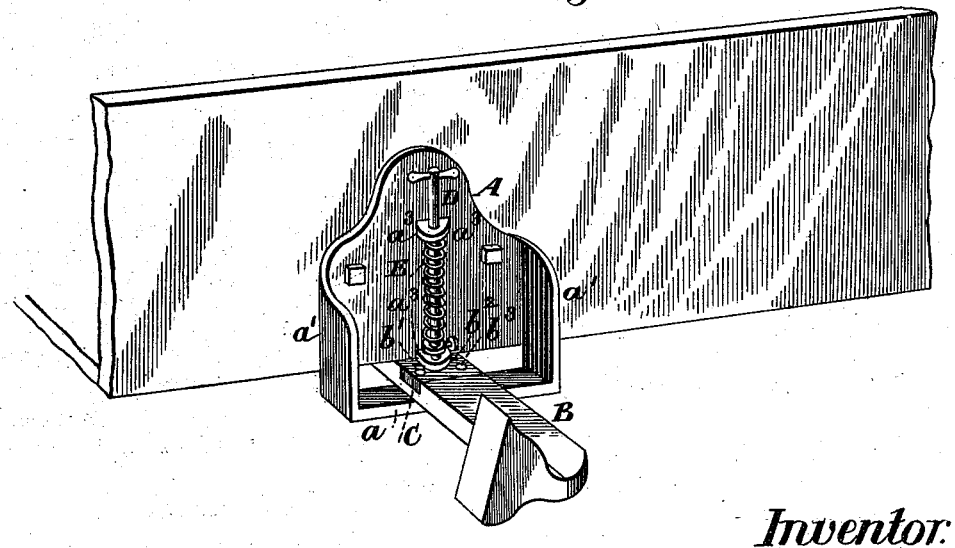

Figure 1 of the drawings is a plan view with the wagon-body removed, and Fig. 2 a side elevation in perspective.

In the drawings, A represents a metallic stirrup, which may be in one piece or in several pieces fastened together. This stirrup is bolted to the side and bottom of the wagon-body, so as to allow the brake-bars B B to be fulcrumed on its base $a$, between its sides $a'$ $a'$, in the hole $a^2$. Each bar has an iron plate, C, having the holes $b'$ $b^2$ $b^3$, the first transversely and the last longitudinally in line with the middle one, $b^2$. $a^3$ $a^3$ are parallel ears on the stirrup, through which is guided the pin D, held down by a spiral spring, E, so that the pin may be held fast in either of the holes $b'$ $b^2$ $b^3$ of the bar and the hole $a^2$ of the stirrup.

The brake-bars B B may be third-class levers, fulcrumed as set forth, and connected by cords or chains E with a first-class lever, F, operated by the driver by hand or foot mechanism.

When the weather is muddy and it is desired to prevent the rubbers from becoming clogged with mud carried on the wheels, the brake-bars B are adjusted laterally in a backward direction, and when it is wished to take up wear they are adjusted laterally in a forward direction. When it is desired to go into the woods, the bars are adjusted longitudinally toward the wagon, so that the rubbers will strike no trees or stumps.

Having thus described all that is necessary to a full understanding of our invention, what we claim as new, and desire to protect by Letters Patent, is—

The stirrup A, having hole $a^2$ and carrying the spring-pin D in ears $a^3$ $a^3$, in combination with brake-bars B B, having the holes $b'$ $b^2 b^3$, whereby said brake-bars may be adjusted, as and for the purposes set forth.

In testimony whereof we affix our signatures in presence of two witnesses.

JOHN W. HARTMAN.
HENRY P. CLAY.

Witnesses:
JOHN H. BLACKBURN,
RICHARD SANDS.